United States Patent
Dey, IV et al.

(10) Patent No.: US 11,207,756 B2
(45) Date of Patent: Dec. 28, 2021

(54) POWER TOOL BLADE TYPE DETECTION AND AUTOMATIC SPEED ADJUSTMENT

(71) Applicant: MILWAUKEE ELECTRIC TOOL CORPORATION, Brookfield, WI (US)

(72) Inventors: John S. Dey, IV, Milwaukee, WI (US); Corey J. Dickert, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/382,636

(22) Filed: Apr. 12, 2019

(65) Prior Publication Data
US 2019/0314946 A1    Oct. 17, 2019

Related U.S. Application Data

(60) Provisional application No. 62/656,448, filed on Apr. 12, 2018.

(51) Int. Cl.
*B23Q 15/12* (2006.01)
*B23D 59/00* (2006.01)
(Continued)

(52) U.S. Cl.
CPC ........... *B23Q 15/12* (2013.01); *B23D 45/044* (2013.01); *B23D 59/001* (2013.01); *B23G 1/225* (2013.01)

(58) Field of Classification Search
CPC ................................. B25F 5/00; G05B 19/418
(Continued)

(56) References Cited

U.S. PATENT DOCUMENTS 5,177,828 A * 1/1993 Von Vett ............... A47L 11/162
                                                         15/49.1
5,984,020 A   11/1999 Meyer et al.
(Continued)

FOREIGN PATENT DOCUMENTS

CN    2119981 U    10/1992
CN    1250705 A    4/2000
(Continued)

OTHER PUBLICATIONS

Chinese Patent Office action for Application No. 201910293524.7 dated Feb. 26, 2021 (9 pages including statement of relevance).

*Primary Examiner* — Ghassem Alie
(74) *Attorney, Agent, or Firm* — Michael Best & Friedrich LLP

(57) ABSTRACT

Systems and methods are provided for an electric tool (e.g., a power tool) that includes an output driver for receiving an accessory, and an accessory-type detector. A motor of the electric tool is coupled to the output driver for driving the accessory. The power tool also includes an operation trigger for activating the motor and a motor controller. The motor controller includes an electronic processor that is coupled to the accessory-type detector, the motor, the operation trigger, and a memory. The memory stores instructions that when executed by the electronic processor cause the motor controller to detect a characteristic of the accessory from output of the accessory-type detector. The motor controller determines an operational characteristic for the accessory based on the detected characteristic, and controls operation of the motor to drive the accessory according to the operational characteristic when the operation trigger is activated.

10 Claims, 4 Drawing Sheets

(51) Int. Cl.
*B23D 45/04* (2006.01)
*B23G 1/22* (2006.01)

(58) Field of Classification Search
USPC ........................ 83/58–63, 72, 76.1
See application file for complete search history.

(56) References Cited

U.S. PATENT DOCUMENTS

| | | | | |
|---|---|---|---|---|
| 6,853,300 | B2* | 2/2005 | Kuan | B23D 59/001 340/545.2 |
| 7,073,421 | B1* | 7/2006 | Verhalen | B24B 3/463 451/422 |
| 7,431,682 | B2* | 10/2008 | Zeiler | B23B 45/00 483/9 |
| 10,045,668 | B2* | 8/2018 | Green | A47K 10/424 |
| 10,422,088 | B2* | 9/2019 | Gustavsson | E02F 5/101 |
| 10,607,184 | B2* | 3/2020 | Taulbee | G06K 7/10366 |
| 2004/0173066 | A1* | 9/2004 | Abdollahzadeh | E06B 9/266 83/13 |
| 2006/0173576 | A1* | 8/2006 | Goerg | A47K 10/3662 700/236 |
| 2006/0234617 | A1* | 10/2006 | Francis | G09F 3/00 452/174 |
| 2012/0138322 | A1* | 6/2012 | Neubauer | B26D 5/00 173/2 |
| 2013/0193248 | A1* | 8/2013 | Orozco Ramirez | B65H 16/005 242/160.1 |
| 2016/0016240 | A1* | 1/2016 | Koegel | B23D 47/12 83/76.8 |
| 2016/0167186 | A1* | 6/2016 | Chan | B25F 5/00 173/2 |

FOREIGN PATENT DOCUMENTS

| | | |
|---|---|---|
| CN | 1282653 A | 2/2001 |
| CN | 102224469 A | 10/2011 |
| CN | 104870133 A | 8/2015 |
| CN | 204695084 U | 10/2015 |
| CN | 105142862 A | 12/2015 |
| CN | 105856169 A | 8/2016 |
| CN | 105856171 A | 8/2016 |

* cited by examiner

POWER TOOL BLADE TYPE DETECTION AND AUTOMATIC SPEED ADJUSTMENT

RELATED APPLICATIONS

This application claims priority to U.S. Provisional Patent Application Ser. No. 62/656,448, filed on Apr. 12, 2018, which is incorporated herein by reference in its entirety.

TECHNICAL FIELD

Embodiments described herein relate to power tools. More specifically, embodiments described herein relate to automatic control of power tools based on detection of power tool accessory type or presence by an accessory-type detector.

SUMMARY

A power tool generally utilizes an accessory, such as, a blade, a grinding disk, a drill bit, and the like for performing a particular type of operation. Some power tools are configured to interchange different accessories. Different power tool accessories may have different characteristics, for example, they may be made of different materials, have different dimensions, or they may be designed to perform different tasks. The characteristics of a particular accessory, or type of accessory, may affect the performance of a power tool or may impose constraints on operation of the power tool. For example, different accessory types may be configured to work at different rotational speeds or applied torque.

In some embodiments, a method for controlling operation of a power tool includes receiving an accessory by an output driver of the power tool. The output driver is coupled to a motor of the power tool and the accessory is driven by the motor. A characteristic of the accessory is detected by a motor controller that is coupled to an accessory-type detector of the power tool. The motor controller includes an electronic processor and a memory. The motor controller determines an operational characteristic for the accessory based on the detected characteristic of the accessory. When an operation trigger of the power tool is activated, the motor controller controls operation of the motor that drives the accessory according to the operational characteristic.

In some embodiments, a power tool includes an output driver for receiving an accessory and an accessory-type detector. A motor of the power tool is coupled to the output driver for driving the accessory. The power tool also includes an operation trigger for activating the motor and a motor controller. The motor controller includes an electronic processor that is coupled to the accessory-type detector, the motor, the operation trigger, and a memory. The memory stores instructions that when executed by the electronic processor, cause the motor controller to detect a characteristic of the accessory from output of the accessory-type detector. The motor controller determines an operational characteristic for the accessory based on the detected characteristic of the accessory, and controls operation of the motor to drive the accessory according to the operational characteristic when the operation trigger is activated.

In some embodiments, an electric tool includes an output driver for receiving an accessory and an accessory-type detector. A motor of the electric tool is coupled to the output driver for driving the accessory. The electric tool also includes an operation trigger for activating the motor and a motor controller. The motor controller includes an electronic processor that is coupled to the accessory-type detector, the motor, the operation trigger, and a memory. The memory stores instructions that when executed by the electronic processor, cause the motor controller to detect a characteristic of the accessory from output of the accessory-type detector. The motor controller determines an operational characteristic for the accessory based on the detected characteristic of the accessory, and controls operation of the motor to drive the accessory according to the operational characteristic when the operation trigger is activated.

In some embodiments, the accessory-type detector is coupled to a housing of the electric tool or the power tool.

In some embodiments, the accessory is a saw and the accessory characteristic comprises a material of which the saw is made.

In some embodiments, the operational characteristic comprises a speed for rotating the motor that drives the output driver and the accessory.

In some embodiments, the characteristic of the accessory comprises a physical characteristic of the accessory or a modification made to the accessory.

In some embodiments, the motor controller disables activation of the motor when the accessory-type detector detects that an accessory is not received by the output driver.

In some embodiments, the motor controller may enable activation of the motor when the accessory-type detector detects that an accessory is received by the output driver.

Other aspects of the invention will become apparent by consideration of the detailed description and accompanying drawings.

DETAILED DESCRIPTION

Figure 1:
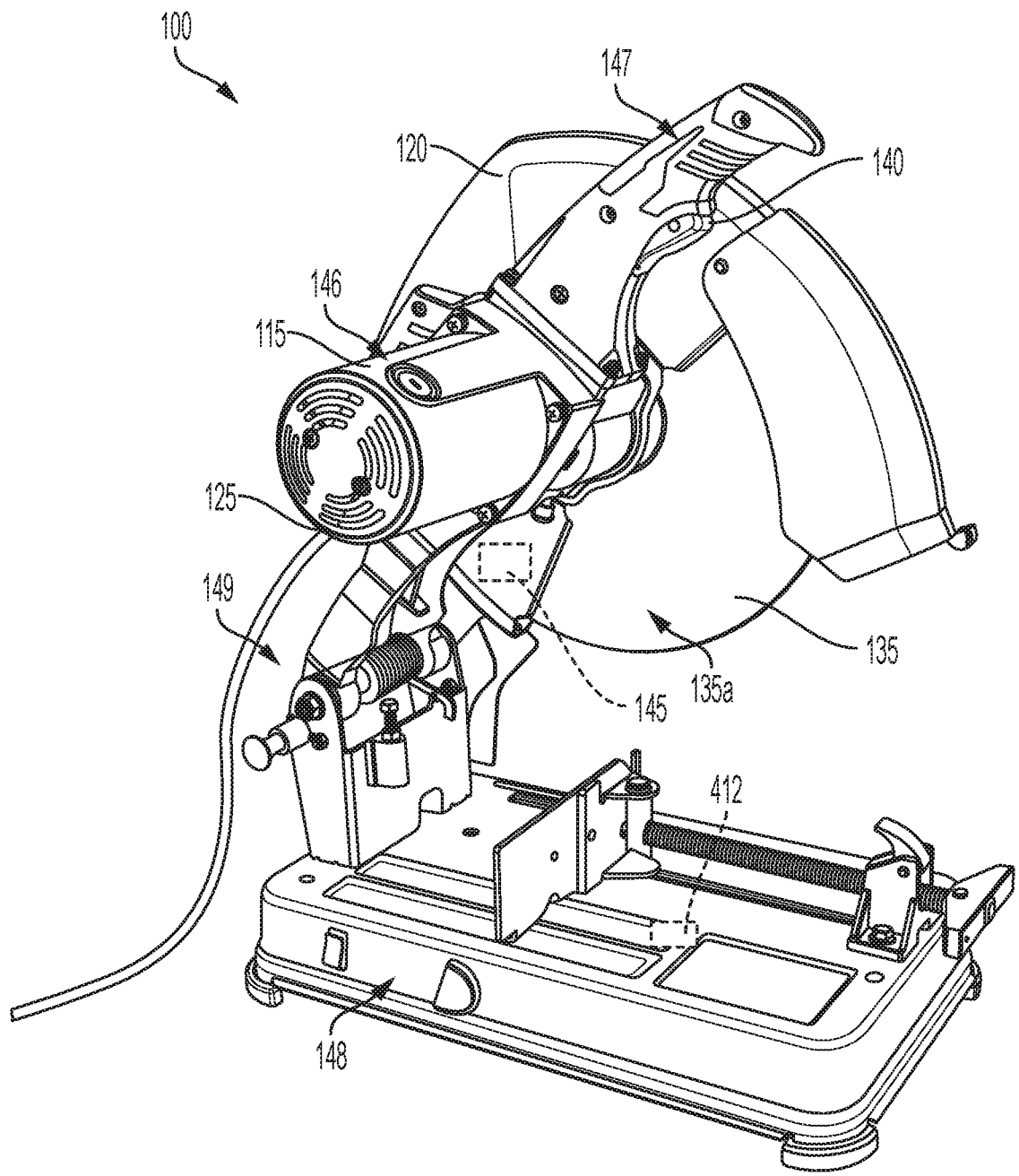
FIG. 1 illustrates an example of an electric tool with an accessory and an accessory-type detector.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Some electric tools are configured to receive multiple different types of accessories, for example, saw blades (e.g., reciprocating or circular), grinding disks, drill bits, driver bits, and variations thereof made of different materials, sizes, and shapes. However, different accessories may work more efficiently, more accurately, with less wear, or a combination thereof, when utilized with different operational characteristics, for example, different linear or rotational speeds, acceleration patterns, or directions. In some embodiments described herein, methods and systems provide a tool component that senses what type of accessory is attached to the tool. The tool is configured to automatically operate at the appropriate speed, acceleration, or other operating characteristic based on the detected type of attached accessory. For example, when a user turns the tool on, the tool may operate at a speed or acceleration appropriate for the attached type of accessory. In one example comprising a chop saw, a blade type may be detected and a speed setting may be automatically applied for driving the saw based on the blade type. When the blade is replaced with a second type of blade (or a grinder, for example) the second blade type is detected and the speed setting is automatically changed to a second speed according to the second type of blade.

FIG. 1 illustrates an example of an electric tool 100 with an accessory and an accessory-type detector. In this example, the electric tool 100 is a chop saw and may be referred to as the chop saw 100. The electric tool 100 includes a tool housing 115, a blade guard 120, a power interface 125, an accessory 135, a tool activation trigger 140, and an accessory-type detector 145. The accessory 135 in this example is a saw blade and may be referred to as the blade 135. The housing 115 includes a motor housing 146, a handle 147, a base 148, and a hinge 149 pivotably coupling the motor housing 146 to the base 148. The electric tool 100 may also be referred to as a power tool 100.

Although, the exemplary electric tool 100 is shown as a chop saw, the electric tool 100 may be any electric tool (or power tool) that drives an output driver. Such electric tools include, for example, drills, circular saws, jig saws, band saws, table saws, miter saws, reciprocating saws, angle grinders, straight grinders, hammers, multi-tools, impact wrenches, rotary hammers, drill-drivers, hammer drill-drivers, impact drivers, angle drills, belt sanders, orbital sanders, planers, pipe cutters, grease guns, vacuum cleaners, fluid flow control devices, outdoor power equipment (such as blowers, chain saws, edgers, hedge trimmers, lawn mowers, or trimmers), and the like. The vacuum cleaners can include wet/dry vacuums, dust removal vacuums that may be connectable to power tools (e.g., saws or sanders), stick vacuums, hand vacuums, upright vacuums, carpet cleaners, hard surface cleaners, canister vacuums, broom vacuums, and the like. The fluid flow control devices can include motorized water pumps, electronically controllable water flow valves, and the like. The electric tool 100 may also include other types of appliances, machines, or devices that receive and drive an accessory to perform an operation.

In some embodiments, the housing 115 (in particular, the motor housing 146), supports a motor (see FIG. 2) that drives the accessory 135. For example, the motor may drive rotation of the blade 135. The housing 115 may also support a motor controller and other components that enable operation of the electric tool 100 (see FIG. 2). The blade guard 120 is mechanically coupled to the housing 115 and is disposed around and/or beside the blade 135. The blade guard 135 serves as a safety device to cover portions of the blade 135. During operation, the trigger 140 is pulled to activate the chop saw 100 and rotate the blade 135, and the handle is pulled downward by the operator bringing the blade 135 toward the base 148 to cut a workpiece (not shown) that is received by and supported on the base 148. The hinge 149 may be spring-biased such that the motor housing 146 returns to an upright position as illustrated in FIG. 1 when the operator releases the handle 147.

The accessory 135 includes a detectable characteristic. The characteristic may be a physical characteristic of the accessory 135 or the accessory 135 may be modified with a characteristic that identifies the accessory type. The accessory-type indicator, as a characteristic of the accessory 135, may include an identifying mark or an attached tag that may be sensed, read, or optically captured by the accessory-type detector 145. Detectable physical characteristics may include, for example, a type of material that the accessory is made of, a texture, shape, or size of the accessory 135 or a portion of the accessory 135. For example, a metal accessory versus a non-metal accessory are two types of materials that may be detected.

In some embodiments, the power interface 125 is configured to receive a removable and rechargeable power tool battery pack (not shown) that may be operable with a suite of two or more of power tools, fluid flow control devices, test and measurement devices, work site radios, and work lights. The power tool battery pack includes a housing within which are one or more battery cells, which may be lithium ion ("Li-ion") cells, Nickel-Cadmium ("Ni-Cad") cells, or cells of another chemical type. The cells, collectively, may provide nominal voltages of different values, depending on the pack. For example, the power tool battery pack may have a nominal output voltage of 4V, 12V, 18V, 28V, 36V, 40V, a voltage between levels, or other levels. In some embodiments, the power interface 125 is an alternating current (AC) power interface that is configured to be connected to a standard AC outlet that is further coupled to an AC power grid or AC generator. For instance, the AC source may include an approximately 120 V, 60 Hz power signal or an approximately 240 V, 50 Hz power signal.

The tool activation trigger 140 is coupled to the electronic processor and supported by the housing 115 and may initiate activation of the electric tool 100 when actuated or depressed by a user.

The accessory-type detector 145 may be mounted on the blade guard 120 (e.g., on the outside or on the inside of the blade guard 120), the tool housing 115, or on any other structure of the electric tool 100 such that the accessory-type detector 145 can detect which type of accessory 135 is attached to the power tool 100. For example, in some embodiments, the accessory-type detector has a first sensing side and a second mounting side opposite the first sensing side. The mounting side may be secured to the inside of the blade guard 120 (e.g., via fasteners, adhesive, welding, and the like), while the sensing side includes a sensor with a sensing face directed toward a side face 135a of the blade 135. The accessory-type detector 145 is configured to detect one or more characteristics of the accessory 135. In some embodiments, the accessory-type detector 145 includes an inductive sensor that detects and provides an indication of whether the accessory 135 is metal or non-metal. In some embodiments, the accessory-type detector 145 includes an optical sensor that detects and provides an indication of a characteristic such as the type, size, shape, texture, or material of the accessory 135. Other suitable types of sensors may be used as the accessory-type detector 145, for example, radio frequency identification (RFID), sound, light, tactile or heat sensors. In some embodiments, the accessory-type detector 145 detects and provides an indication of whether or not the accessory 135 is received in place, such as attached to the electric tool 100. The controller may prevent activation of a tool component when the tool activation trigger is pulled and the accessory 135 is missing or placed incorrectly. Moreover, in some embodiments, the accessory 135 may comprise an identifying mark or a tag that may be sensed or read by the accessory-type detector 145, and may indicate which type of accessory 135 is attached to the electric tool 100. The mark or tag may include, among other things, one or more of an RF or RFID emitter, an optically detectable feature such as a type of bar code, a color, a light emitter, and an acoustically detectable feature or sound emitter.

Figure 2:
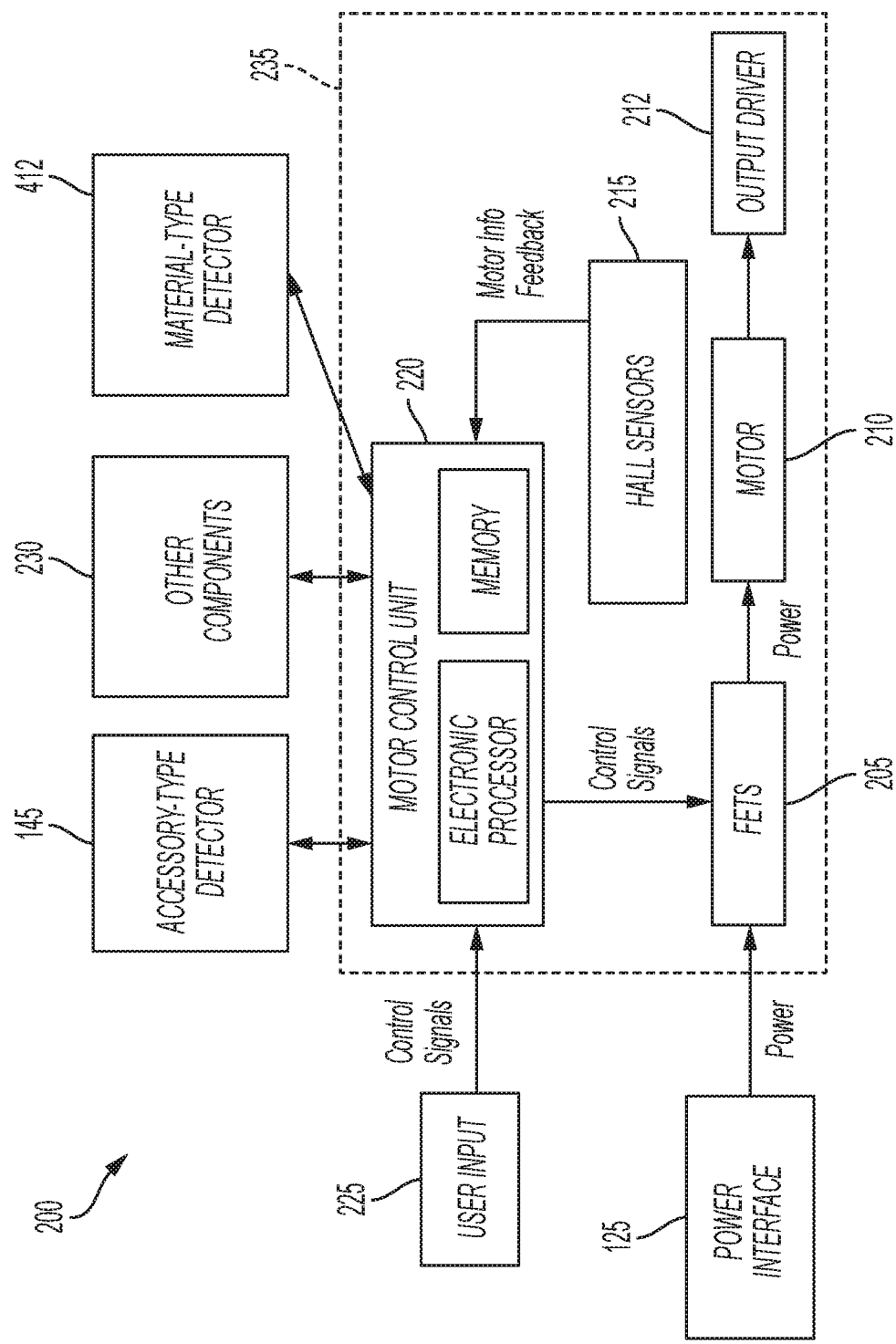
FIG. 2 is a block diagram of the exemplary electric tool with the accessory-type detector of FIG. 1.

FIG. 2 is a block diagram of the exemplary electric tool 100 with the accessory-type detector 145 of FIG. 1. A system 200 of the electric tool 100 includes, among other things, the power interface 125, the accessory-type detector 145, field effect transistors (FETs) 205, a motor 210, an output driver 212, Hall sensors 215, a motor controller 220, user input 225, and other components 230 (battery pack fuel gauge, work lights (LEDs), current/voltage sensors, etc.). The motor controller 220 may also be referred to as an electronic motor controller or a motor microcontroller and includes, among other things, an electronic processor and a memory. In some embodiments, the memory stores instructions that are executed by the electronic processor to implement the functionality of the motor controller 220 described herein.

The output driver 212 is configured to receive an electric tool accessory 135, for example, a blade or drill. The output driver 212 is, for example, an arbor for receiving a saw blade or a chuck for receiving a drill bit. The accessory-type detector 145 detects characteristics of the accessory 135 and communicates data indicating the accessory characteristics to the motor controller 220. The Hall sensors 215 provide motor information feedback, such as motor rotational position information, which can be used by the motor controller 220 to determine motor position, velocity, and/or acceleration. The motor controller 220 receives user controls from user input 225, such as by depressing the trigger 140 or shifting a forward/reverse selector of the electric tool 100. In response to the accessory characteristic, the motor information feedback, and/or user controls, the motor controller 220 transmits control signals to accurately control the FETs 205 to drive the motor 210. By selectively enabling and disabling the FETs 205, power from the power interface 125 is selectively applied to stator windings of the motor 210 to cause rotation of a rotor of the motor 210. The rotating rotor of the motor 210 drives the output driver 212 and the accessory 135 at an appropriate operational characteristic, such as a specified speed, acceleration, and/or direction, according to the accessory characteristic. Although not shown, the motor controller 220 and other components of the electric tool 100 are electrically coupled to and receive power from the power interface 125. The FETs 205 may also be referred to as power switching elements. The FETs 205, motor 210, Hall sensors 215, motor controller 220, and output driver 212 may be referred to as electromechanical components 235 of the electric tool 100.

As noted above, the accessory-type detector 145 detects one or more accessory characteristics of the accessory 135 on the output driver 212 and outputs data to the motor controller 220 indicative of the detected one or more accessory characteristics. Further, in some embodiments, the accessory-type detector 145 is configured to output an indication to the motor controller 220 of whether an accessory is coupled to the output driver 212. In some embodiments, the accessory-type detector 145 is one or more of an inductive sensor, an optical sensor, a radio frequency identification (RFID) sensor, sound sensor (microphone), a light sensor, a tactile sensor, and a heat sensor.

Although described with respect to the example of the chop saw 100 of FIG. 1, the block diagram 200 generally applies to other embodiments of the electric tool 100. For example, the output driver 212 in the case of a power drill-driver is a chuck; the output driver 212 in the case of a vacuum is an impeller providing suction force; and the output driver 212 in the case of a water pump is a pumping mechanism. Further, in some embodiments of the electric tool 100, a brushed motor is provided as the motor 210 to drive the output driver 212.

Figure 3:
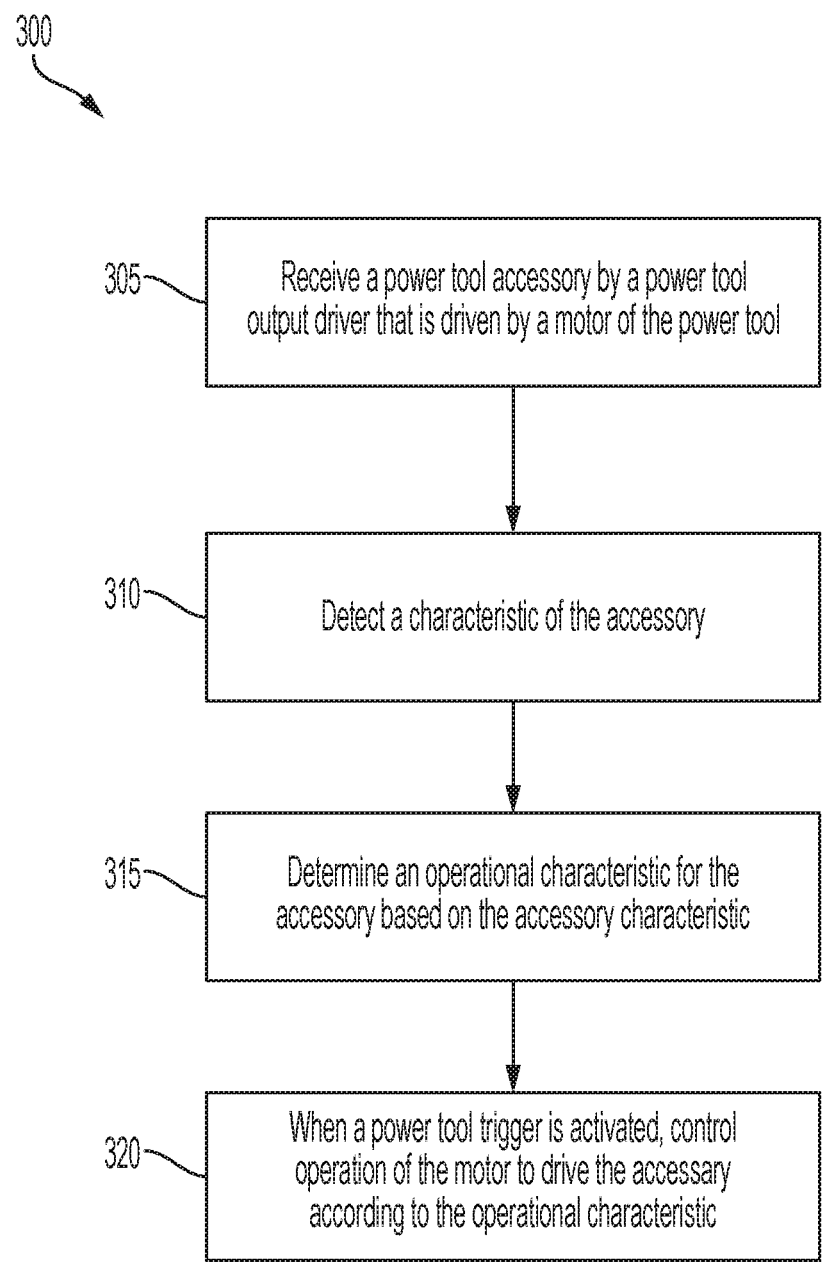
FIG. 3 illustrates a method for controlling an electric tool based on a type of accessory attached to the tool.

FIG. 3 illustrates a method 300 for controlling an electric tool based on a type of accessory attached to the tool. In some embodiments, the method 300 is implemented with one of the embodiments of the electric tool 100 of FIG. 1 and, accordingly, the method 300 will be described with respect to the system 100. However, in some embodiments, the method 300 is implemented with other systems or other types of electric tools as described above.

In block 305, the power tool 100 receives the accessory 135 at the output driver 212. As part of receiving the accessory 135, in some embodiments, the output driver 212 is tightened, clamped, or otherwise manipulated (e.g., by a user) to retain the accessory 135. For example, in some embodiments, the power tool 100 is a chop saw that receives at an arbor a blade or grinder from a plurality of different types of blades and grinders.

In block 310, an accessory-type detector 145, coupled to or integrated within the electric tool 100, detects a characteristic of the accessory 135. As noted above, in some embodiments, the accessory-type detector 145 is connected to the electric tool 100 such that the accessory-type detector 145 detects the accessory characteristic of the accessory 135. For example, the accessory-type detector 145 may be mounted on the housing 115 or the blade guard 120. The motor controller 220 receives data from the accessory-type detector 145 that indicates the accessory characteristic. For example, in some embodiments, the accessory characteristic is at least one selected from the group of a material type (e.g., metal versus non-metal), a blade type (e.g., chop saw blade versus grinder), a texture, shape, or size of the accessory or a portion of the accessory, and an identifying mark (e.g., that identifies one or more of the type of accessory, model number, material type, blade type, texture type, shape, or size). For example, the accessory-type detector 145 may be an inductive sensor that outputs a digital signal indicating the presence or absence of metal (e.g., digital logic signal of "0" indicates metal, digital logic signal of "1" indicates non-metal). In another embodiment, the accessory-type detector 145 is a bar code reader that outputs a first value when no bar code is read or an invalid bar code is read, and outputs another value indicative of a read bar code value when a bar code is read. In another embodiment, the accessory-type detector 145 is an optical sensor, Hall sensor, inductive sensor, capacitive sensor, or the like, that outputs an analog signal (e.g., between 0-3.3 volts or 0-5 volts) indicative of the sensed characteristic. For example, the range of potential analog signal values corresponds to the levels of the characteristic that can be sensed by the sensor. For example, when the accessory-type detector 145 is a Hall sensor, the sensor outputs 0 volts when no or very low magnetic field is sensed, and outputs 2.5 volts when a medium strength magnetic field (e.g., from a magnet on the accessory 135) is sensed, and outputs 5 volts when a strong magnetic field is sensed. Various other sensor types and configurations are contemplated in different embodiments.

In block 315, the motor controller determines an operational characteristic for the accessory 135 based on the accessory characteristic. The memory of the motor controller 220 may associate various accessory characteristics to corresponding accessory operational characteristics for controlling the motor 210 and the accessory 135.

For example, in some embodiments, the memory of the motor controller 220 includes a data table mapping accessory characteristics to operational characteristics, where the accessory characteristics serve as an index into the table and the operational characteristics are corresponding outputs of the table. For example, in some embodiments, the memory maps an abrasive blade type (an accessory characteristic of some chop saw blades) to a first motor speed (an example operational characteristic), and a metal blade (an accessory characteristic of some other chop saw blades) to a second motor speed (another example operational characteristic), where the first motor speed is faster than the second motor speed. However, the disclosure is not limited to this or other specific mappings between accessory characteristics to corresponding operational characteristics. The data table may be generated through testing and stored in the memory at the time of manufacture and/or may be updated. Additionally, the data table may be particular to the type of electronic tool 100. In other words, as an example, the data table for a chop saw may be different than the data table for a drill-driver.

In block 320, when the power tool trigger 140 is actuated by a user, the motor controller controls operation of the motor 210 to drive the output driver 220 and the accessory 135 according to the operational characteristic determined based on the accessory characteristic. For example, in some embodiments, the operational characteristic sets a pulse width modulated (PWM) duty ratio for driving the FETs 205, which thereby sets the speed of the motor 210. For example, when cycling power to the FETs 205 to drive the motor, the driving signal selectively provided by the motor controller 220 to each FET 205 is provided with the determined PWM duty ratio. In other embodiments, the operational characteristic is a current driving value, a current threshold, an input into a proportional-integral-derivative (PID) controller setting a target motor speed or other operational characteristics of the electronic tool 100.

In some embodiments, in block 310, in addition to or instead of the accessory-type detector 145 detecting a characteristic of the accessory 135, the accessory-type detector 145 detects, and provides an indication to the motor controller 220, of whether an accessory is coupled to or properly coupled to the output driver 212. In response to receiving an indication from the accessory-type detector 145 that an accessory is not coupled or not properly coupled to the output driver 212, the motor controller 220 disables activation of the motor based on the accessory-type detector 145 detecting that the accessory is not received by the output driver 212. For example, the motor controller 220 may continue to loop on block 310 until an accessory is detected as coupled or properly coupled to the output driver 212, rather than proceeding to block 315. However, in response to receiving an indication from the accessory-type detector 145 that an accessory is coupled or properly coupled to the output driver 212, the motor controller enables activation of the motor based on the accessory-type detector detecting that an accessory is received by the output driver. For example, the motor controller 220 may proceed to block 315 upon detecting that an accessory is coupled or properly coupled to the output driver 212. In one embodiment, the motor controller 220 determines that an accessory is coupled when the accessory-type detector 145 outputs valid data. For example, when the accessory-type detector 145 is a Hall sensor and the accessories are expected to have a magnet to be sensed by the Hall sensor, an indication of 0 volts (or less than some threshold value) from the Hall sensor may indicate the absence of the accessory 135, while an indication of 5 volts (or above some threshold value) because the magnetic field of the magnet of the accessory 135 impinges the sensor indicates the presence of the accessory 135.

Figure 4:
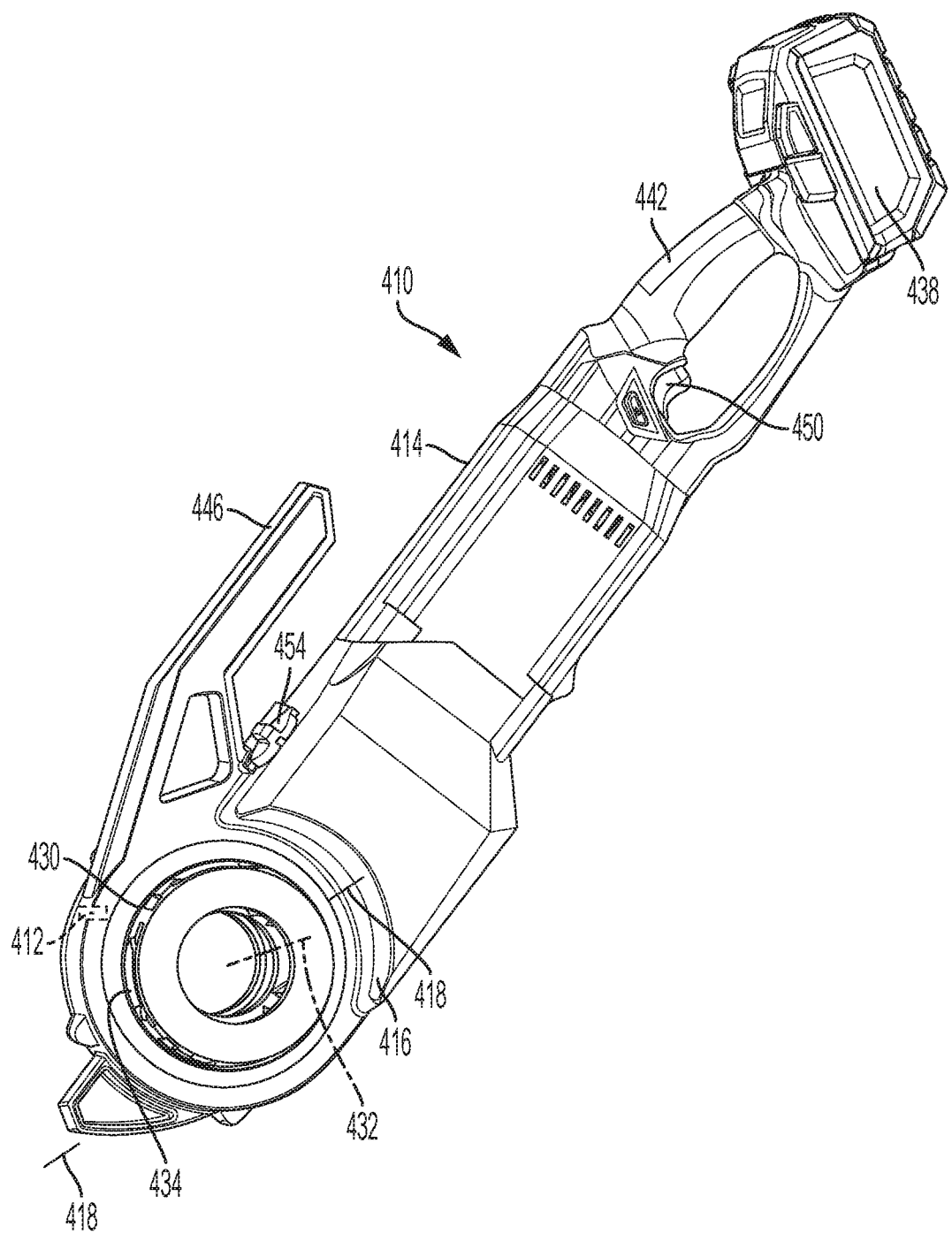
FIG. 4 illustrates an example of a pipe threader tool with a pipe material-type detector.

As noted above, although the exemplary electric tool 100 is shown as a chop saw, the electric tool 100 may be any electric tool (or power tool) that drives an output driver. FIG. 4 illustrates an example of a pipe threader electric tool that has a pipe material-type detector. Referring to FIG. 4, a pipe threader 410 has a housing 414 including a gearcase 416, a drive assembly 418 including a motor and a transmission (not shown), and a die holder 430 for selectively receiving a die 434 with teeth for cutting threads on a pipe (not shown) and defining a rotational axis 432. The motor is powered by a battery 438 that is selectively coupled to the housing 414. The housing 414 further includes an operating handle 442 and a support handle 446. The pipe threader 410 includes a trigger 450 on the operating handle 442 for activating the motor, and a speed shift knob 454 allowing an operator to switch the die holder 430 (and thus the die 434) between a high rotational speed and a low rotational speed. The pipe threader 410 has a material-type detector 412 that is mounted on the housing 414. The pipe threader 410 also includes a motor controller, such as the motor controller 220, that is also communicatively coupled to the material-type detector 412 and the pipe threader motor (the motor 210), as illustrated in FIG. 2. In some embodiments of the pipe threader, the motor controller 220 is configured to read sensor data from the material-type detector 412 and control operational characteristics of the pipe threader 410 such as speed, torque, current draw, or other motor or tool performance characteristic.

The material-type detector 412 may be mounted on the housing 414 or another structure of the pipe threader 410 such that the material-type detector 412 is able to detect the type of material of the pipe. In some embodiments, the material-type detector 412 has a first sensing side and a second mounting side opposite the first sensing side. The mounting side may be secured to the housing 414 (e.g., via fasteners, adhesive, welding, and the like), while the sensing side includes a sensor with a sensing face directed toward a surface of a pipe that is received by the pipe threader 410. The material-type detector 412 is configured to detect one or more characteristics of the pipe. In some embodiments, the material-type detector 412 includes an inductive sensor that detects and provides an indication of whether the pipe is metal or non-metal. In some embodiments, the material-type detector 412 includes an optical sensor that detects and provides an indication of a characteristic such as the type, size, shape, texture, or material of the received pipe. Other suitable types of sensors may be used as the material-type detector 412, for example, radio frequency identification (RFID), sound, light, tactile or heat sensors. Moreover, in some embodiments, the received pipe may comprise an identifying mark or a tag that may be sensed or read by the material-type detector 412, and may indicate which type of pipe is received by the pipe threader 410. The mark or tag may include, among other things, one or more of an RF or RFID emitter, an optically detectable feature such as a type of bar code, a color, a light emitter, and an acoustically detectable feature or sound emitter.

The material-type detector 412 is configured to sense the type of material from which the pipe is made (e.g., when the pipe is received by the pipe threader for threading). Based on the type of material sensed by the material-type detector 412, the motor controller 220 is configured to vary operational characteristics such as speed, torque, pressure, or other motor or tool performance characteristic to improve the threading of the pipe being threaded. For example, an operator may arrange the die 434 on a pipe to be threaded and the material-type detector 412 may determine the type of material of the pipe. The operator may press against a non-rotating portion of the die 434 in the direction of the rotational axis 432. The operator then presses trigger 450 to activate the motor. As a result, the transmission transmits torque from the motor to the die holder 430 such that the die holder 430 rotates while holding the die 434, causing the die 434 to rotate and move along the pipe to cut threads on the pipe. Based on the type of material sensed by the material-type detector 412, the motor controller 220 is configured to vary operational characteristics of the pipe threader 410 such as the speed, torque, pressure, and/or other motor or tool performance characteristic to improve the threading of the pipe. For example, the motor controller 220 may increase the speed or torque of the motor 126 by increasing the duty cycle of a PWM signal that forms the control signals provided to the FETs 205, resulting in increased current flowing to the stator coils of the motor 210. Similarly, the motor controller 220 may decrease the speed or torque of the motor 126 by reducing the duty cycle. The particular operational characteristic for a particular detected material may specified in a lookup table stored in the memory of the motor controller 220. For example, the motor controller 220 may apply the identified material type to the lookup table as an input/index, and the output of the lookup table indicates the operational characteristic.

In another embodiment, the electronic tool 100 may be a saw (e.g., the chop saw as shown in FIG. 1, reciprocating saw, or circular saw) that includes a material-type detector 412. The material-type detector 412 may be also be mounted on a housing, blade guard, or any other structure of the saw such that the material-type detector 412 is able to detect the type of material of the work piece. For example, in FIG. 1, the material-type detector 412 is shown integrated into the base of the chop saw. The material-type detector 412 is configured to sense the type of material that is being cut (e.g., metal, wood, a density of wood, etc.). For example, the material-type detector 412 may be a ferromagnetic sensor or a density sensor, etc. Using similar techniques as described above, based on the type of material sensed by the material-type sensor 412, the motor controller 220 is configured to vary an operational characteristic such as speed, torque, current draw, or other motor or tool performance characteristic to improve cutting performance of the work piece based on the type of material being cut. In some embodiments, with reference FIG. 3, the motor controller 220 determines the operational characteristic in block 315 based on both the identified accessory type of the accessory 135 (detected by the accessory type detector 145) and the identified material type of the workpiece (detected by the material-type detector 415). For example, a lookup table stored in the memory of the motor controller 220 may map accessory types and workpiece material types to an operational characteristic.

Thus, the disclosure provides, among other things, automatic control of power tools based on detection of power tool accessory type or accessory presence by an accessory-type detector. Various features and advantages of the disclosure are set forth in the following claims.

We claim:

1. A power tool comprising:
   an output driver for receiving an accessory;
   an accessory-type detector;
   a motor coupled to the output driver for driving the accessory;
   an operation trigger for activating the motor; and
   a motor controller comprising an electronic processor coupled to the accessory-type detector, the motor, the operation trigger, and a memory, wherein the memory stores instructions that when executed by the electronic processor configure the motor controller to:
      detect, from output of the accessory-type detector, a characteristic of the accessory,
      determine an operational characteristic for the accessory based on the characteristic of the accessory detected by the motor controller,
      control operation of the motor to drive the accessory according to the operational characteristic when the operation trigger is activated,
      disable activation of the motor when the accessory-type detector detects that the accessory is not coupled to the output driver; and
      enable activation of the motor when the accessory-type detector detects that the accessory is coupled to the output driver;
   wherein the accessory-type detector includes a magnetic sensor, and
   wherein the accessory includes a magnet that impinges the magnetic sensor such that the magnetic sensor detects a magnetic field.

2. The power tool of claim 1, wherein the power tool is a saw and the accessory-type detector is mounted on a blade guard of the saw.

3. The power tool of claim 1, wherein the power tool is a saw and the accessory-type detector is mounted on a housing of the saw.

4. The power tool of claim 1, wherein the accessory is a saw blade and the accessory characteristic comprises a material of which the saw blade is made.

5. The power tool of claim 1, wherein the operational characteristic comprises a speed for rotating the motor that drives the output driver and the accessory.

6. The power tool of claim 1, wherein the characteristic of the accessory comprises a physical characteristic of the accessory or a modification made to the accessory.

7. The power tool of claim 1, further comprising:
   a material-type detector,
   wherein the accessory is a saw blade,
   wherein the memory stores further instructions that, when executed by the electronic processor configure the motor controller to detect, from output of the material-type detector, a characteristic of a workpiece for cutting by the saw blade, and
   wherein determining the operational characteristic for the accessory is further based on the detected characteristic of the workpiece.

8. The power tool of claim 1, wherein the magnetic sensor is a Hall effect sensor.

9. The power tool of claim 1, wherein the magnetic sensor outputs a voltage indicative of the sensed magnetic field.

10. The power tool of claim 9, wherein a first voltage is output when no magnetic field is sensed, a second voltage is output when a medium strength magnetic field is sensed, and a third voltage is output when a strong magnetic field is sensed.

\* \* \* \* \*